(12) United States Patent
Shao et al.

(10) Patent No.: US 12,452,335 B2
(45) Date of Patent: Oct. 21, 2025

(54) METHODS AND SMART GAS INTERNET OF THINGS SYSTEMS FOR DETERMINING GAS ABNORMITY FOR SAFE GAS USE

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Xiaojun Wei, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 485 days.

(21) Appl. No.: 18/050,043

(22) Filed: Oct. 26, 2022

(65) Prior Publication Data
US 2024/0106897 A1    Mar. 28, 2024

(30) Foreign Application Priority Data
Sep. 27, 2022    (CN) .......................... 202211180951.2

(51) Int. Cl.
*H04L 67/12* (2022.01)
*G06Q 50/06* (2012.01)
*G16Y 10/35* (2020.01)
*G16Y 20/20* (2020.01)

(52) U.S. Cl.
CPC ............. *H04L 67/12* (2013.01); *G06Q 50/06* (2013.01); *G16Y 10/35* (2020.01); *G16Y 20/20* (2020.01)

(58) Field of Classification Search
CPC ........ G06Q 50/06; G16Y 10/35; G16Y 20/20; H04L 67/12
See application file for complete search history.

(56) References Cited

U.S. PATENT DOCUMENTS

| 5,866,803 | A | * | 2/1999 | Namba | G01M 3/2807 73/40 |
| 2010/0188261 | A1 | * | 7/2010 | Fujii | G01F 1/66 431/13 |
| 2014/0165731 | A1 | * | 6/2014 | Linford | G01N 29/024 73/592 |
| 2015/0093292 | A1 | * | 4/2015 | Hagimoto | F01N 11/00 422/119 |

FOREIGN PATENT DOCUMENTS

CN    111275577 B    *    3/2021

* cited by examiner

*Primary Examiner* — Kidest Worku
(74) *Attorney, Agent, or Firm* — METIS IP LLC

(57) ABSTRACT

The embodiments of the present disclosure provide a method and smart gas Internet of Things (IoT) system for determining a gas abnormity for a safe gas use. The method is implemented by a smart gas IoT system including a smart gas user platform, a smart gas service platform, a smart gas safety management platform, a smart gas indoor device sensing network platform, and a smart gas indoor device object platform. The method is performed by the smart gas safety management platform, including: receiving request information of a target user, the request information including a request of the target user for analyzing a gas abnormity cause; extracting user data based on the request information, and extracting gas data based on the user data; and determining, based on the user data and the gas data, analysis information of the gas abnormity cause.

11 Claims, 5 Drawing Sheets

METHODS AND SMART GAS INTERNET OF THINGS SYSTEMS FOR DETERMINING GAS ABNORMITY FOR SAFE GAS USE

CROSS-REFERENCE TO RELATED APPLICATION

This application claims priority of Chinese Patent Application No. 202211180951.2, filed on Sep. 27, 2022, the contents of which are entirely incorporated herein by reference.

TECHNICAL FIELD

The present disclosure relates to the field of an Internet of Things, and in particular to a method and an Internet of Things system for determining a gas abnormity for a safe gas use.

BACKGROUND

Gas is an integral part of a complete set of modern facilities that must be possessed in building a modern city. The development of urban gas energy may greatly improve the efficiency of thermal energy utilization. The development of urban gas energy is not only a requirement of urban modernization, but also an important measure to save energy consumption, protect the urban environment and improve people's living standards.

With the continuous development of the country's gas industry, the gas has become a common energy source for every household. However, users have various problems when using the gas. For example, a gas stove does not catch fire, a gas water heater cannot heat up water, etc. There are many reasons for a gas abnormity, and sometimes the user cannot quickly and accurately determine the reason for the gas abnormity, and may even find a wrong solution for the gas abnormity and cause a hidden danger to gas safety.

Therefore, a more efficient method is required on how to help users accurately and quickly determine the gas abnormity cause and help generate effective solutions.

SUMMARY

One or more embodiments of the present disclosure provide a method for determining a gas abnormity for a safe gas use. The method is implemented by a smart gas Internet of Things (IoT) system. The system includes a smart gas user platform, a smart gas service platform, a smart gas safety management platform, a smart gas indoor device sensing network platform, and a smart gas indoor device object platform. The method is performed by the smart gas safety management platform, including: receiving request information of a target user, the request information including a request of the target user for analyzing a gas abnormity cause; extracting user data based on the request information, and extracting gas data based on the user data; and determining, based on the user data and the gas data, analysis information of the gas abnormity cause.

One of the embodiments of the present disclosure provides the smart gas IoT system, the system including a smart gas user platform, a smart gas service platform, and a smart gas safety management platform, a smart gas indoor device sensing network platform, and a smart gas indoor device object platform, the smart gas safety management platform including a smart gas indoor safety management sub-platform and a smart gas data center, the smart gas indoor safety management sub-platform interacting with the smart gas data center in two directions. The smart gas safety management platform is configured to: receive request information of a target user from the smart gas user platform by the smart gas data center based on the smart gas service platform, the request information including a request of the target user for analyzing a gas abnormity cause. The smart gas indoor safety management sub-platform is configured to: extract user data based on the request information, and obtain, based on the user data, the gas data extracted by the smart gas indoor device object platform through the smart gas indoor device sensing network platform; and determine, based on the user data and the gas data, analysis information of the gas abnormity cause, and send the analysis information of the gas abnormity cause to the smart gas data center; send the analysis information of the gas abnormity cause to the smart gas user platform by the smart gas data center through the smart gas service platform.

One or more embodiments of the present disclosure provide a non-transitory computer-readable storage medium storing computer instructions, when reading the computer instructions in the storage medium, a computer implements the method for determining the gas abnormity for the safe gas use.

BRIEF DESCRIPTION OF THE DRAWINGS

The present disclosure is further described in terms of exemplary embodiments. These exemplary embodiments are described in detail with reference to the drawings. These examples are not limiting, and in these examples, the same numbers refer to the same structures, wherein.

DETAILED DESCRIPTION

Figure 1:
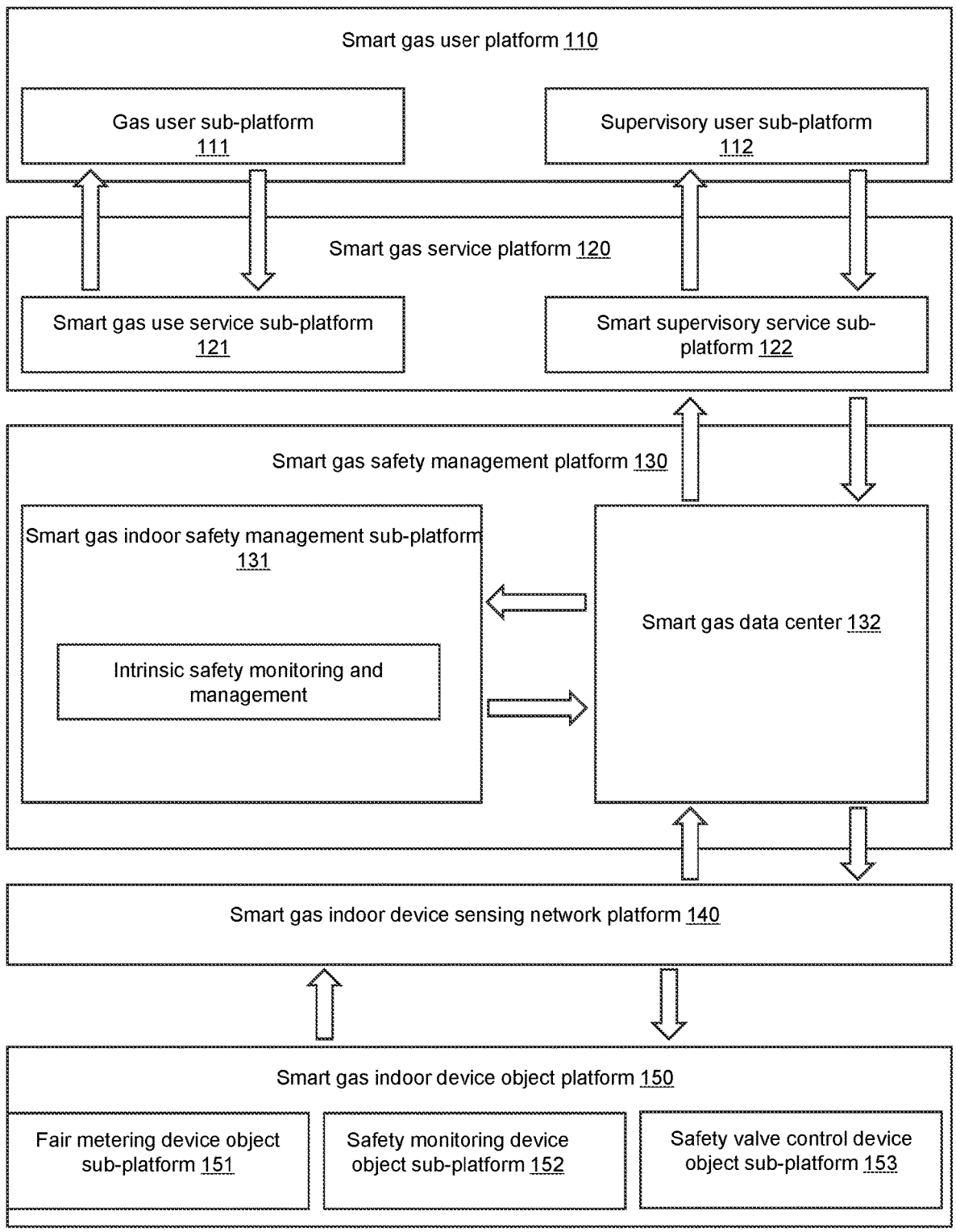
FIG. 1 is a schematic diagram illustrating a platform structure of a smart gas Internet of Things (IoT) system according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system", "device", "unit" and/or "module" used in the specification are means used to distinguish different components, elements, parts, segments, or assemblies. However, these words may be replaced by other expressions if they serve the same purpose As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated operations and/or components, but do not preclude the presence or addition of one or more other operations and/or components thereof.

The flowcharts used in the present disclosure illustrate operations that systems implement according to some embodiments in the present disclosure. It is to be expressly understood, the operations of the flowchart may be not implemented in order. Conversely, the operations may be implemented in inverted order, or simultaneously. Moreover, one or more other operations may be added into the flowcharts. One or more operations may be removed from the flowcharts.

An Internet of Things (IoT) system is an information processing system that includes part or all of a user platform, a service platform, a management platform, a sensing network platform, and an object platform. The user platform is a functional platform configured to obtain user's perceptual information and generate control information. The service platform may be configured to connect the management platform and the user platform, and plays the functions of perceptual information service communication and control information service communication. The management platform may plan and coordinate the connection and cooperation between various functional platforms (e.g., the user platform and the service platform). The management platform gathers the information of the IoT operation system and may provide functions of perception management and control management for the IoT operation system. The service platform may be configured to connect the management platform and the object platform, and plays the functions of perceptual information service communication and control information service communication. The user platform is a functional platform configured to obtain the user's perceptual information and generate control information.

The processing of information in the IoT system may be divided into a processing flow of the user's perceptual information and a processing flow of the control information. The control information may be information generated based on the user's perceptual information. In some embodiments, the control information may include user's demand control information, and the user's perceptual information may include user's query information. The processing of the perceptual information includes the object platform obtaining the perceptual information and transmitting the perceptual information to the management platform through the sensing network platform. The user's demand control information may be transmitted from the management platform to the user platform through the service platform, thereby realizing the control of sending prompt information.

FIG. 1 is a schematic diagram illustrating a platform structure of a smart gas IoT system according to some embodiments of the present disclosure. As shown in FIG. 1, a smart gas IoT system 100 includes a smart gas user platform 110, a smart gas service platform 120, a smart gas safety management platform 130, a smart gas indoor device sensing network platform 140, and a smart gas indoor device object platform 150.

In some embodiments, the smart gas IoT system 100 may receive user's request information when the gas device used by the user is abnormal, and process the user's request information and gas data of the gas device used by the user to determine gas abnormity cause and feedback the analysis information of the gas abnormity cause to the user, so as to help the user to accurately and quickly determine the gas abnormity cause and find a solution in absence of relevant professional knowledge.

The smart gas user platform 110 may refer to a platform configured to obtain the user's request information and to feed back the analysis information of the gas abnormity cause to the user. In some embodiments, the smart gas user platform 110 may be configured as a terminal device, such as a mobile phone, a tablet, a computer, or the like. In some embodiments, the smart gas user platform 110 may interact with the smart gas service platform 120 to obtain and issue the user's request information to the smart gas service platform 120. For example, the smart gas user platform 110 may obtain the request information of "the gas stove does not catch fire, please query the cause" input by the user through the terminal device, and send the request information to the smart gas service platform 120 for query. In some embodiments, the smart gas user platform 110 may receive the analysis information of the gas abnormity cause uploaded by the smart gas service platform 120, and feed back the analysis information of the gas abnormity cause to the user.

In some embodiments, the smart gas user platform 110 may include a gas user sub-platform 111 and a supervisory user sub-platform 112. The gas user sub-platform 111 may refer to a platform configured to provide gas users with gas data and the analysis information of the gas abnormity cause. In some embodiments, the gas user sub-platform 111 may correspond to and interact with a smart gas use service sub-platform 121 to obtain a service of safe gas use. The supervisory user sub-platform 112 may refer to a platform configured to supervise an operation of the smart gas IoT system 100 for a supervisory user. In some embodiments, the supervisory user sub-platform 112 may correspond to and interact with a smart supervisory service sub-platform 122 to obtain a service required by a safety supervisory.

Figure 2:
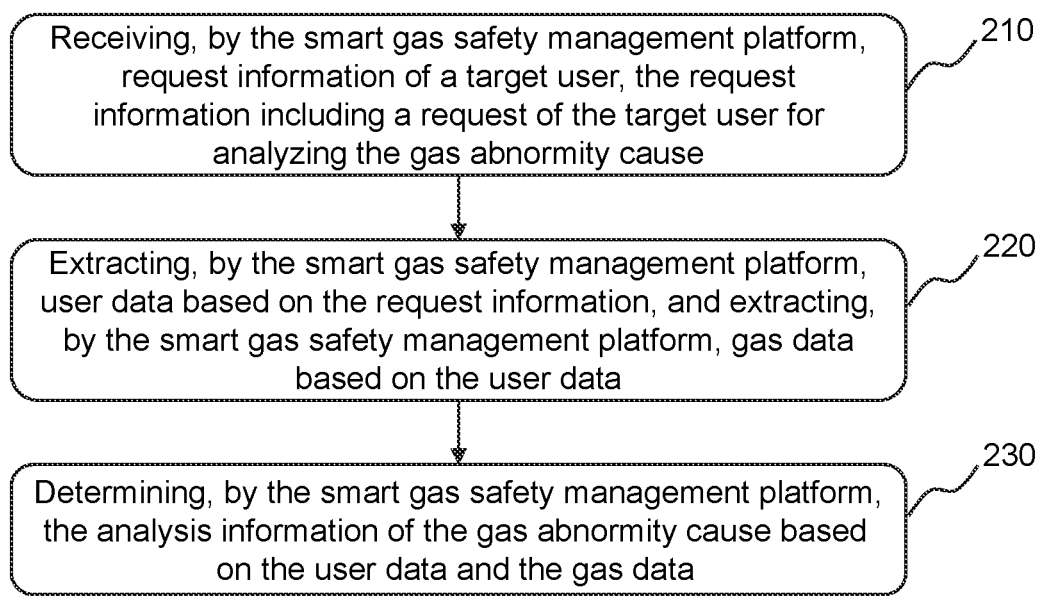
FIG. 2 is an exemplary flowchart illustrating a method for determining a gas abnormity for a safe gas use according to some embodiments of the present disclosure.

For more contents of the user's request information, the analysis information of the gas abnormity cause, and the gas data, please refer to FIG. 2 and its related descriptions.

The smart gas service platform 120 may refer to a platform for receiving and transmitting data and/or information. In some embodiments, the smart gas service platform 120 may interact with the smart gas user platform 110, receive the user's request information issued by the smart gas user platform 110, and upload the analysis information of the gas abnormity cause to the smart gas user platform 110. In some embodiments, the smart gas service platform 120 may interact with the smart gas safety management platform 130, issue the user's request information to the smart gas safety management platform 130, and receive the analysis information of the gas abnormity cause uploaded by the smart gas safety management platform 130.

In some embodiments, the smart gas service platform 120 may include the smart gas use service sub-platform 121 and the smart supervisory service sub-platform 122. In some embodiments, the smart gas use service sub-platform 121 may correspond to the gas user sub-platform 111 to provide the gas users with the safe gas use service. In some embodiments, the smart supervisory service sub-platform 122 may correspond to the supervisory user sub-platform 112 to provide the supervisory user with the service required by the safety supervision.

The smart gas safety management platform 130 may refer to a platform configured to plan and coordinate the connection and cooperation between various functional platforms, and gather all the information of the IoT, and provide functions of the perceptual management and the control management for the IoT operation system. In some embodiments, the smart gas safety management platform 130 may be configured to receive the request information of a target user, the request information may include the request of target user for analyzing gas abnormity cause, extract the user data based on the request information, and extract the gas data based on the user data; determine the analysis information of the gas abnormity cause based on the user data and the gas data.

In some embodiments, the smart gas safety management platform 130 may include a smart gas indoor safety management sub-platform 131 and a smart gas data center 132. In some embodiments, the smart gas indoor safety management sub-platform 131 may interact with the smart gas data center 132 in a two-way, and the smart gas indoor safety management sub-platform 131 may obtain and feedback safety management data (e.g., the user data, the gas data, the analysis information of the gas abnormity cause, etc.) from the smart gas data center 132.

In some embodiments, the smart gas indoor safety management sub-platform 131 may include an intrinsic safety monitoring and management module 1311. In some embodiments, the intrinsic safety monitoring and management module 1311 may be configured to monitor related information of gas safety. For example, the intrinsic safety monitoring and management module 1311 may monitor related information of gas explosion-proof safety such as a leakage of gas terminal machinery, an electrical power consumption (such as a smart control power consumption, a communication power consumption), a valve control, etc. In some embodiments, the intrinsic safety monitoring and management module 1311 may preset a safety monitoring threshold. If related data of gas safety (e.g., the gas data) sent by the smart gas data center 132 and received by the intrinsic safety monitoring and management module 1311 exceeds the safety monitoring threshold, the intrinsic safety monitoring and management module 1311 automatically alarms and optionally pushes the alarm information to the gas user sub-platform 111 and the supervisory user sub-platform 112 automatically. In some embodiments, the smart gas indoor safety management sub-platform 131 may further include other safety monitoring and management modules (e.g., an information safety monitoring and management module, a functional safety monitoring and management module), and different safety monitoring and management modules may perform different functions, which is not limited here.

In some embodiments, information interactions among the smart gas safety management platform 130 and the upper-layer smart gas service platform 120 and the lower-layer smart gas indoor device sensing network platform 140 is all performed through the smart gas data center 132, and the smart gas data center 132 may summarize and store all operational data of the IoT operation system. In some embodiments, the smart gas data center 132 may receive the user's request information issued by the smart gas service platform 120, and send the user data and the gas data extracted based on the user's request information to the smart gas indoor safety management sub-platform 131 for analysis and processing, and the smart gas indoor safety management sub-platform 131 may send the processed data to the smart gas data center 132, and the smart gas data center 132 then sends the summarized and processed data (for example, analysis information of the gas abnormity cause, etc.) to the smart gas service platform 120. In some embodiments, the smart gas data center 132 may issue an instruction for obtaining information related to the gas abnormity (e.g., whether there is gas leakage, etc.) to the smart gas indoor device sensing network platform 140, and receive the information related to the gas abnormity uploaded by the smart gas indoor device sensing network platform 140.

For more contents of the target user and the user's data, please refer to FIG. 2 and its related descriptions. For more contents of the method for determining the analysis information of the gas abnormity cause, please refer to FIGS. 2-5 and the related descriptions.

The smart gas indoor device sensing network platform 140 may refer to a platform for unified management of the sensing communication. In some embodiments, the smart gas indoor device sensing network platform 140 may be configured as a communication network and a gateway. The smart gas indoor device sensing network platform 140 may use a plurality of groups of gateway servers or a plurality of groups of intelligent routers, which are not limited here.

In some embodiments, the smart gas indoor device sensing network platform 140 may be connected with the smart gas safety management platform 130 and the smart gas indoor device object platform 150 to implement the functions of perceptual information sensing communication and control information sensing communication. In some embodiments, the smart gas indoor device sensing network platform 140 may interact with the smart gas indoor device object platform 150, receive the information related to the gas abnormity uploaded by the smart gas indoor device object platform 150, and issue the instruction for obtaining the information related to the gas abnormity to the smart gas indoor device object platform 150. In some embodiments, the smart gas indoor device sensing network platform 140 may interact with the smart gas safety management platform 130, receive the instruction for obtaining the information related to the gas abnormity issued by the smart gas safety management platform 130, and upload the information related to the gas abnormity to the smart gas safety management platform 130.

The smart gas indoor device object platform 150 may refer to a platform configured to obtain the information related to the gas abnormity. In some embodiments, the smart gas indoor device object platform 150 may be configured as various gas-related device, such as an indoor gas device, a gas safety detection device, or the like. In some embodiments, the smart gas indoor device object platform 150 may interact with the smart gas indoor device sensing network platform 140, receive the instruction for obtaining the information related to the gas abnormity issued by the smart gas indoor device sensing network platform 140, and upload the information related to the gas abnormity to the smart gas indoor device sensing network platform 140.

In some embodiments, the smart gas indoor device object platform 150 may include a fair metering device object sub-platform 151, a safety monitoring device object sub-platform 152 and a safety valve control device object sub-platform 153. In some embodiments, the smart gas indoor device object platform 150 may obtain the information related to the gas abnormity through the above object sub-platform. For example, it may be determined whether there is the gas leakage through the safety monitoring device object sub-platform 152 (e.g., a gas concentration detection device).

In some embodiments of the present disclosure, the smart gas IoT system 100 is built through an IoT functional system structure of five platforms and arranged by combining the main platform and the sub-platforms, which may not only share a data processing pressure of the main platform, but also ensure an dependency of each data, and ensure classified transmission and tractability of the data, and classified issuance and processing of the instructions, making the structure and data processing of the IoT clear and controllable and facilitating the management, control and data processing of the IoT.

FIG. 2 is an exemplary flowchart illustrating a method for determining a gas abnormity for a safe gas use according to some embodiments of the present disclosure. In some embodiments, the process 200 may be performed by the smart gas safety management platform 130. As shown in FIG. 2, the process 200 may include the following operations.

In 210, receiving, by the smart gas safety management platform, request information of a target user, the request information including a request of the target user for analyzing the gas abnormity cause.

The target user may refer to a user with a gas abnormity.

In some embodiments, the request information may further include user image data uploaded by the user. The user image data may refer to image data about the gas abnormity, for example, pictures, videos and/or audios, etc.

The request for analyzing the gas abnormity cause may refer to an instruction for requesting analysis sent by the target user based on the gas abnormity and determining a gas abnormity cause. For example, when the gas used by the target user is abnormal, but the target user cannot determine the gas abnormity cause timely and accurately, the target user may send a request for analyzing the gas abnormity cause.

In 220, extracting, by the smart gas safety management platform, user data based on the request information, and extracting, by the smart gas safety management platform, gas data based on the user data.

The user data may refer to data of the target user itself. For example, the user data may include, but is not limited to, positioning information of the target user, a gas use type of the target user, and/or gas meter number information of the target user, or the like.

The gas data refers to data related to the use of gas by the target user. For example, the gas data may include, but is not limited to, a gas balance, gas pipeline data of all levels involved by the target user, gas usage data and/or gas abnormity data of the target user, or the like. The gas use data may refer to data related to a gas usage, a usage frequency and/or a usage time, and the gas abnormity data may include a number, frequency and/or time of the gas abnormity.

The gas data may be determined based on the user data by the smart gas safety management platform.

In 230, determining, by the smart gas safety management platform, the analysis information of the gas abnormity cause based on the user data and the gas data.

The analysis information of the gas abnormity cause refers to data related to the gas abnormity analysis of the target user. For example, the analysis information of the gas abnormity cause may include the type of at least one abnormity cause, for example, the type may include a primary cause and a secondary cause. For another example, the analysis information of the gas abnormity cause may further include a gas abnormity cause with strong certainty and/or a gas abnormity cause with a low certainty. For another example, the analysis information of the gas abnormity cause may further include a location where the gas abnormity cause occurs and an occurrence possibility of the gas abnormity cause, the location where the gas abnormity cause occurs may include a user terminal and/or a pipeline terminal. For example, when a gas stove cannot be started normally, the analysis information of the gas abnormity cause may be a failure of an ignition device of the gas stove and/or a blockage of a gas nozzle, and the corresponding occurrence probabilities may be 75% and 25%, respectively.

Figure 3:
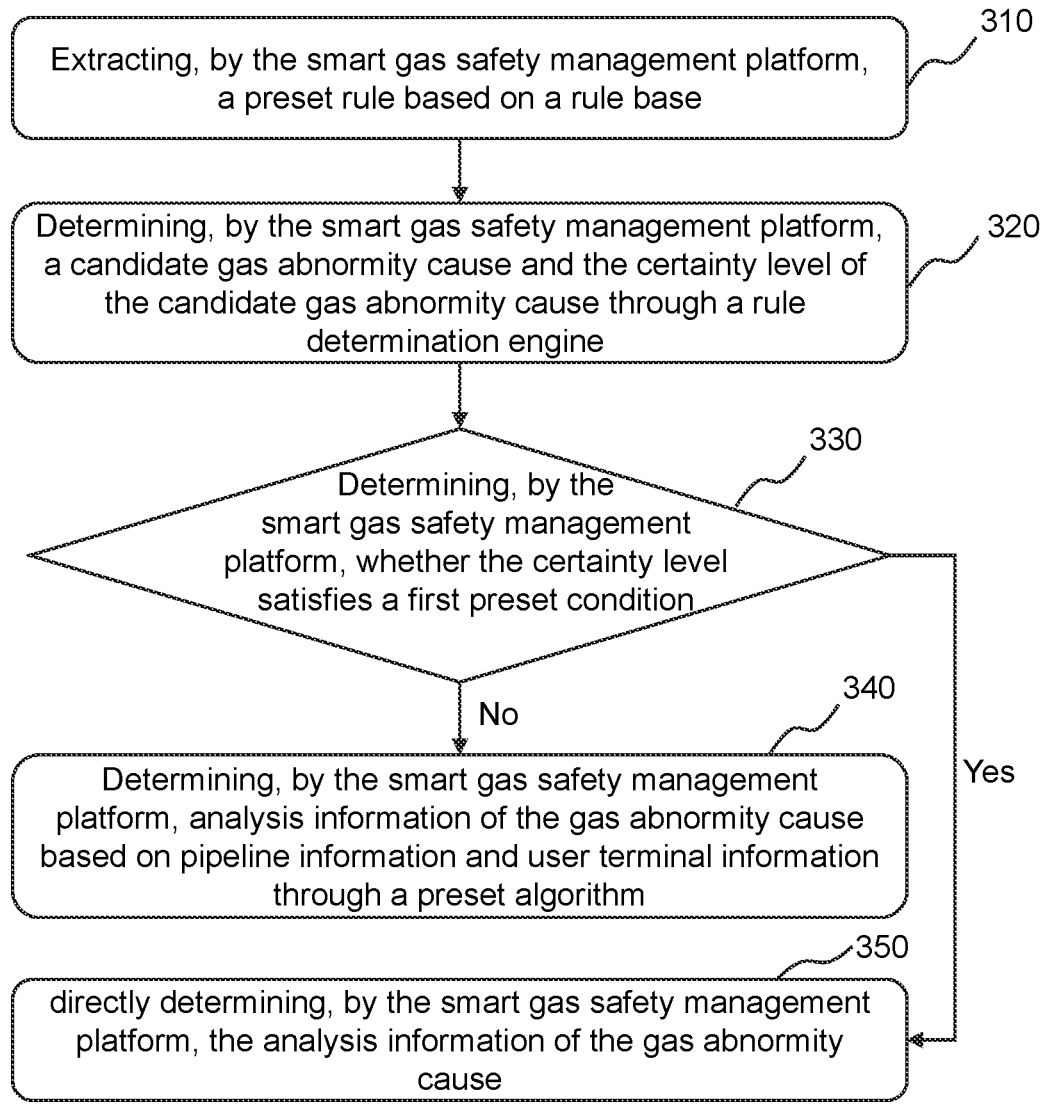
FIG. 3 is an exemplary flowchart illustrating determining analysis information of gas abnormity cause according to some embodiments of the present disclosure.
Figure 5:
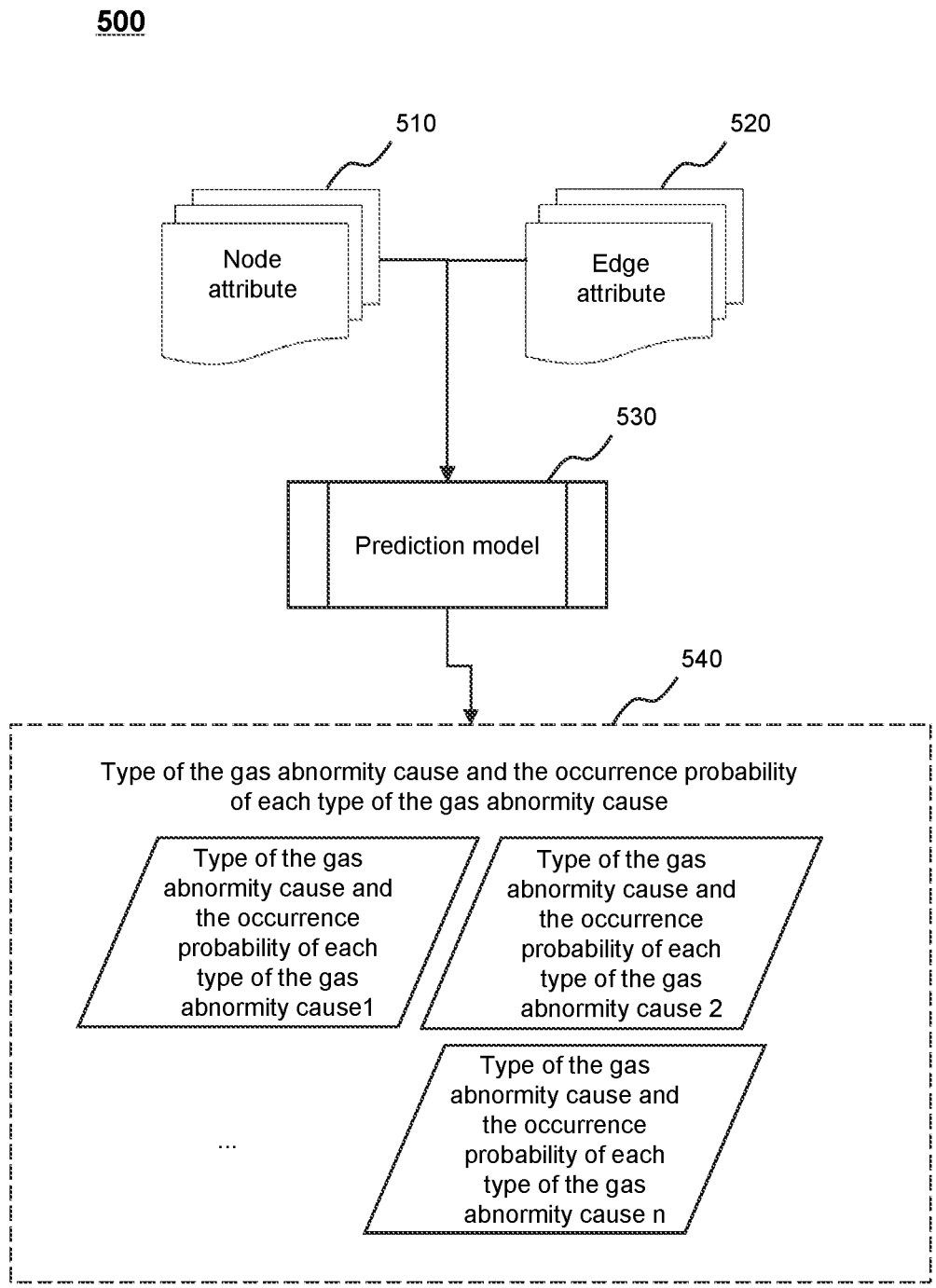
FIG. 5 is an exemplary structural diagram illustrating a multi-type model according to some embodiments of the present disclosure.

For more information on the certainty of the gas abnormity cause, please refer to the contents of other parts of the present disclosure (e.g., FIG. 3, FIG. 5, and the related descriptions).

The occurrence possibility may refer to a possibility of occurrence of the gas abnormity cause. It may be understood that there may be a plurality of gas abnormity causes, and if the gas abnormity cause is different, the corresponding occurrence probability may also be different.

In some embodiments, the smart gas safety management platform may determine the analysis information of the gas abnormity cause using various approaches such as a statistical analysis, a rule base, a preset algorithm, a modeling and/or a mathematical calculation. For example, the smart gas safety management platform may establish a preset rule base and determine the type of gas abnormity cause and its certainty through a preset rule. For another example, the smart gas safety management platform may use the preset algorithm to determine the type of the gas abnormity cause and its occurrence possibility. For more contents on how to determine the analysis information of the gas abnormity cause, please refer to other parts of the present disclosure (e.g., FIG. 4 and the related descriptions).

In some embodiments of the present disclosure, the smart gas safety management platform may quickly and accurately determine the gas abnormity cause and its occurrence possibility by analyzing the request information uploaded through the user and other relevant data and combining with the data of the platform itself to provide the user with timely and effective solution to satisfy the user's demand in absence of relevant professional knowledge.

It should be noted that the above descriptions about the process 200 is only for example and illustration, and does not limit the scope of application of the present disclosure. For those skilled in the art, various modifications and changes may be made to the process 200 under the guidance of the present disclosure. However, these corrections and changes are still within the scope of the present disclosure.

FIG. 3 is an exemplary flowchart illustrating determining analysis information of gas abnormity cause according to some embodiments of the present disclosure. In some embodiments, the process 300 may be performed by the smart gas safety management platform 130. As shown in FIG. 3, the process 300 may include the following operations.

In 310, extracting, by the smart gas safety management platform, a preset rule based on a rule base.

The rule base may refer to a knowledge base composed of various rules. The preset rule may refer to a rule that is artificially set in advance and is used to determine whether user data and gas data meets a condition. For more contents on the user data and the gas data, please refer to FIG. 2 and its related descriptions. In some embodiments, the preset rule may include a rule related to a certainty level for determining the gas abnormity cause. For example, different preset rules may be adopted for different user data and gas data to determine the gas abnormity cause and its certainty level for different situations. For another example, for a user's gas bill balance in the user data, and the preset rule is "the user's gas bill balance is less than 0", is the user's gas bill balance in the user data satisfies this preset rule, the gas abnormity cause may be determined as user's arrears, and the certainty level is 100%.

In 320, determining, by the smart gas safety management platform, a candidate gas abnormity cause and the certainty level of the candidate gas abnormity cause through a rule determination engine.

The rule determination engine may refer to an engine that determines whether the specified filter condition matches a real-time condition at runtime to execute the actions specified in the preset rule according to the specified filter condition contained in the preset rule. In some embodiments, the rule determination engine may be configured to determine whether the user data and the gas data satisfy the preset rule.

The candidate gas abnormity cause may refer to the gas abnormity cause to be processed by the rule determination engine. For more contents on the gas abnormity cause, please refer to FIG. 2 and its related descriptions.

The certainty level may refer to a level of certainty of the gas abnormity cause. In some embodiments, the certainty level may be expressed as a percentage or a grade (e.g., grades I-V). For example, the gas abnormity cause is that the user's balance is insufficient, which may be directly determined, so the certainty level of the gas abnormity cause may be 100% or level V. For another example, the gas abnormity cause is a pipeline leakage, which is a conclusion obtained through data analysis, and the actual situation needs to be further checked, therefore, the certainty level of the gas abnormity cause may be 60% or level III.

In some embodiments, the smart gas safety management platform may determine the candidate gas abnormity cause and the certainty level of the candidate gas abnormity cause through the rule determination engine. For example, the smart gas safety management platform determines that the gas abnormity cause is a pipeline maintenance and the certainty level of pipeline maintenance is 100% through the rule judgment engine. For another example, the smart gas safety management platform determines that the gas abnormity cause is a pipeline terminal failure and its certainty level is 50% according to an occurrence possibility of the pipeline terminal failure through the rule determination engine.

In 330, determining, by the smart gas safety management platform, whether the certainty level satisfies a first preset condition.

The first preset condition may refer to a condition set in advance for determining whether it is necessary to further obtain other data to continue to analyze the gas abnormity cause. For example, the first preset condition may be that the certainty level is greater than or equal to 90%. For another example, the first preset condition may be that the certainty level is greater than or equal to level IV.

In 340, in response to a determination that the certainty level does not satisfy the first preset condition, determining, by the smart gas safety management platform, analysis information of the gas abnormity cause based on pipeline information and user terminal information through a preset algorithm.

The pipeline information may refer to information related to a gas pipeline. In some embodiments, the pipeline information may include pipeline gas information and pipeline terminal information. The pipeline gas information may refer to information related to the gas in the pipeline, such as a density, a gas pressure, and a flow direction of the gas. The terminal information of the pipeline may refer to relevant information of a terminal device of the pipeline, for example, whether a gas valve is opened or not.

The user terminal information may refer to the information related to the user's gas terminal device, for example, whether the gas meter is operating normally, whether the gas stove is damaged, etc.

In some embodiments, the pipeline information and the user terminal information may be determined based on the user data and the gas data. For more information on the user data and the gas data, please refer to FIG. 2 and its related descriptions.

In some embodiments, the smart gas safety management platform may determine the analysis information of the gas abnormity cause through a preset algorithm. For more details about the preset algorithm, please refer to FIG. 4 and its related descriptions.

In 350, in response to a determination that the certainty level satisfies the first preset condition, directly determining, by the smart gas safety management platform, the analysis information of the gas abnormity cause. In some embodiments, when the certainty level satisfies the first preset condition, the smart gas safety management platform may determine the candidate gas abnormity cause and judges its certainty level through the rule judgment engine, and further determine the analysis information of the gas abnormity cause. For more contents on the analysis information of the gas abnormity cause, please refer to the corresponding descriptions in FIG. 2.

In some embodiments of the present disclosure, it may be determined whether the smart gas safety management platform directly feeds back the gas abnormity cause to the user or obtains other data to continue to analyze the gas abnormity cause through determining the certainty level, which may not only ensure to feedback correct and effective analysis information of the gas abnormity cause to the user, but also relief an operating load of the smart gas safety management platform.

Figure 4:
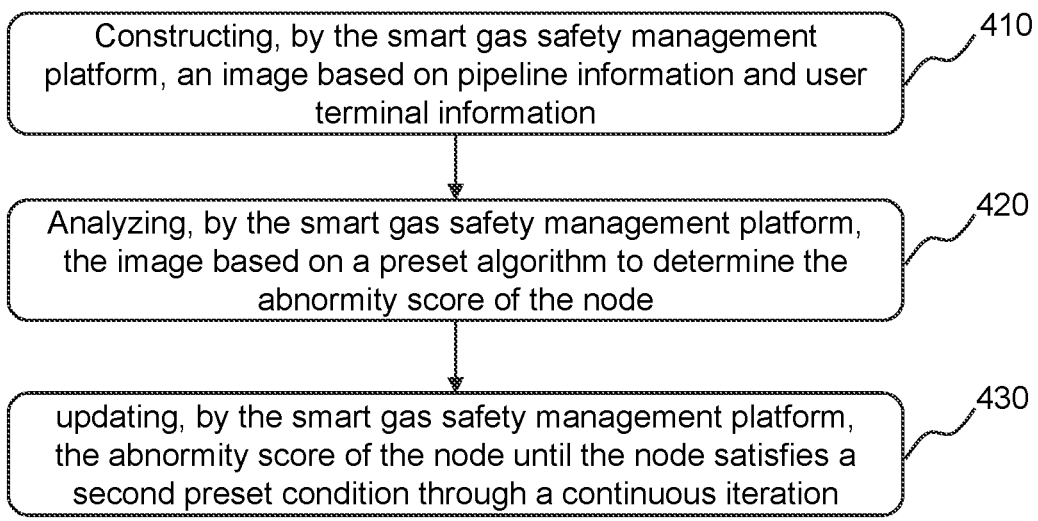
FIG. 4 is an exemplary flowchart illustrating the determining the analysis information of a gas abnormity cause through a preset algorithm according to some embodiments of the present disclosure.

FIG. 4 is an exemplary flowchart illustrating the determining the analysis information of a gas abnormity cause through a preset algorithm according to some embodiments of the present disclosure. In some embodiments, a process 400 may be performed by the smart gas safety management platform 130. As shown in FIG. 4, the process 400 may include the following operations.

In 410, constructing, by the smart gas safety management platform, an image based on pipeline information and user terminal information.

In some embodiments, a node of the image may include a pipeline terminal node and a user terminal node, and an edge of the image may be a gas pipeline between the nodes.

For more contents on the pipeline information and the user terminal information, etc., please refer to FIG. 3 and its related descriptions.

The pipeline terminal node may refer to the node established based on a connection end of the pipeline of all levels. For example, the pipeline terminal node may be a node established based on the connection end of a general pipeline and a branch pipeline. For another example, the pipeline terminal node may be a node established based on the connection end of the branch pipeline and an entry pipeline. The attribute of the pipeline terminal node may include the abnormal score of the node, gas usage data and gas abnormal data.

The abnormity score of the node may refer to a score related to an occurrence possibility of the abnormity of the node. It may be understood that the higher the abnormity score of the node is, the higher the occurrence possibility of the abnormity of the node is.

For more contents on the gas usage data and the gas abnormity data, please refer to other parts of the present disclosure (e.g., FIG. 2 and its related descriptions).

The user terminal node may refer to a node established based on user terminal information. For example, the user terminal node may include a terminal device that uses gas, such as a gas stove, a gas water heater, and/or a gas furnace, or the like. The attribute of the user terminal node may include the abnormity score of the node, the gas usage data, user image data, and the gas abnormity data.

For more description of user image data, please refer to FIG. 2 and related descriptions.

The edge may reflect a connection relationship between different adjacent nodes. When two nodes are connected by a gas pipeline, the two nodes may be connected by the edge, and the direction of the edge may be the direction of a gas transmission. In some embodiments, the attribute of the edge may include a weight value and gas flow information.

The weight value may be the data reflecting an importance of the edge and an occurrence frequency of the gas abnormity of the nodes at both ends of the edge. It may be understood that the higher the importance of the edge is, the higher the occurrence frequency of the gas abnormity of the nodes at both ends of the edge is within a certain time period, and the greater the weight value of the edge is.

In some embodiments, the importance of the corresponding edge may be determined based on the level and/or a delivery capacity of the pipeline. For example, if the level of the general pipeline is higher than the level of the branch pipeline, then the importance of the general pipeline is higher, and the weight value of the edge corresponding to the general pipeline is greater than the weight value of the edge corresponding to the branch pipeline. For another example, if the delivery capacity of a branch pipeline 1 is higher than the delivery capacity of a branch pipeline 2, then the importance of the branch pipeline 1 is higher, and the weight value of the edge corresponding to the branch pipeline 1 is greater than the weight value of the edge corresponding to the branch pipeline 2.

In 420, analyzing, by the smart gas safety management platform, the image based on a preset algorithm to determine the abnormity score of the node.

The preset algorithm may refer to an algorithm set in advance for analyzing and processing an image structure. The preset algorithm may include, but is not limited to, a combination of one or more approaches of a statistical analysis, an induction, a logical transformation, and/or a mathematical calculation.

In 430, updating, by the smart gas safety management platform, the abnormity score of the node until the node satisfies a second preset condition through a continuous iteration.

In some embodiments, the smart gas safety management platform may perform at least one iteration on the image through the preset algorithm, and continuously update the abnormity score of the node until the iteration meets the preset condition, the iteration may end, and the last updated abnormity score of the node may be used as a final score.

In some embodiments, the process of iteratively calculating the abnormity score of each node is as follows: in each round of iteration, for each node, determining the updated abnormity score of the node based on an abnormity score of the node to be updated, the abnormity scores of other nodes directly connected to the node to be updated, and the weight values of the edges between the node and other connected nodes. The updated abnormity score of the node may be taken as the abnormity score of the node to be updated in the next iteration. In the first iteration, the abnormity score of the node to be updated is an initial abnormity score of the node, and the initial abnormity score of the node may be determined based on the gas usage data and the gas abnormity data of the node.

Exemplarily, the algorithm for updating the abnormity score of the ith node in the jth round of iteration may be:

$$V_i' = p*V_i + q*\sum_{k=1}^{K}(V_k*R_{ki})$$

where $V_i'$ denotes the updated abnormity score of the node, i.e., the abnormity score to be updated in the next iteration; $V_i$ and $V_k$ denote the abnormity score of the ith node to be updated and the abnormity score of the kth node to be updated in this iteration; p and q are weight coefficients, which may be determined by the smart gas safety management platform according to the attribute of the nodes and edges in the image; k denotes the node that has an edge connection with the ith node, and K denotes the number of nodes that have an edge connection with the ith node; $R_{ki}$ denotes the weight value of the edge between the ith node and the kth node.

When the second preset condition is satisfied, the iteration may end, and the second preset condition may include a function convergence, an abnormity score of a certain node reaching a threshold, and/or a number of iterations reaching a threshold, or the like.

In some embodiments, the gas usage data and the gas abnormity data may further be updated according to feedback information of a target user. The feedback information may refer to relevant behavior information made by the target user based on the nodes and edges. For example, if the target user restarts the gas stove, but the startup fails, the gas abnormity data of the corresponding user terminal node of the gas stove may be updated, and the abnormity score corresponding to the node may increase properly. For another example, if the user restarts the gas stove, but the startup fails, then the user starts the gas water heater and finds that the gas water heater may be used normally, then the abnormity score of the corresponding user terminal node of the gas water heater remains unchanged, and the weight value of the corresponding edge of the gas water heater may be decreased to reduce an effect of normal data. The data of the corresponding edge of the node that may have abnormity may be focused, thereby improving the efficiency of algorithm iteration.

It may be understood that the weight value of the edge may reflect the data of the occurrence frequency of gas abnormity of the nodes at both ends of the edge. When the occurrence frequency of gas abnormity of the gas stove increases, while the occurrence frequency of gas abnormity of the gas water heater does not change, the weight value of the edge corresponding to the gas stove increases, and the weight value of the edge corresponding to the gas water heater decreases when a sum of the weight values remains unchanged, so as to improve an attention to the edge corresponding to the gas stove with high occurrence frequency of gas abnormity.

In some embodiments, when the gas abnormity data in the attribute of a plurality of same-level nodes is updated, the abnormity score of the common parent node may increase.

The same-level nodes are nodes with the same or similar features, and the common parent node is the parent node with edges directly connected with the plurality of same-level nodes. For example, the gas stove and the gas water heater are the same-level node, and the entry pipeline connected to the gas stove and the gas water heater is the common parent node. For another example, when both the gas stove and the gas water heater fail to start, the gas abnormity data of the corresponding user terminal nodes may be updated, and the abnormity score of the node corresponding to the entry pipeline, which is the common parent node of the two user terminal nodes, may increase. For another example, when five target users all report gas abnormity, the abnormity score of the common parent node corresponding to the five target users (i.e., the node corresponding to the branch pipeline connected to the community) increases.

It may be understood that when gas abnormity occurs in a plurality of same-level nodes, it is likely to be a result of the gas abnormity occurred in the corresponding common parent node of the plurality of same-level nodes. Through increasing the abnormity score of the common parent node properly, the result may be determined based on the preset algorithm, which may be more accurate and more in line with the actual situation.

In some embodiments of the present disclosure, the smart gas safety management platform analyzes and processes images constructed based on the gas data, the pipeline information, and the user terminal information by using the preset algorithm to determine the abnormity scores of a plurality of nodes more quickly, and further determine the occurrence possibility of the abnormity, which may meet the demand of the user, and establish a foundation for further analysis and determination of type of gas abnormity cause.

In some embodiments, the smart gas safety management platform may further use a variety of feasible methods to predict type of abnormity cause and the occurrence possibility of various types of abnormity cause based on the attribute of the current node, the attribute of the adjacent nodes, and the attribute of the adjacent edges.

The attribute of the current node and the adjacent nodes include the updated abnormity scores of the nodes. For example, the smart gas safety management platform may use approaches like a statistical analysis, a cluster analysis and/or a modeling to predict the type of the abnormity cause and the occurrence possibility of various types of abnormity causes.

In some embodiments, the abnormity scores of the updated nodes may be determined based on the preset algorithm. For more contents of the preset algorithm, please refer to FIG. 4 and its related descriptions.

In some embodiments, the smart gas safety management platform may use a prediction model to predict a type of the gas abnormity cause and an occurrence probability of each type of the gas abnormity cause.

FIG. 5 is an exemplary structural diagram illustrating a multi-type model according to some embodiments of the present disclosure.

In some embodiments, a prediction model may include a multi-type model, a convolutional neural network, or a deep neural network, or a model obtained by a combination thereof.

As shown in FIG. 5, an input of a prediction model 530 may include node attribute 510 and edge attribute 520, and an output of the prediction model 530 may include a type of the gas abnormity cause and an occurrence probability of each type of the gas abnormity cause 540. The type of the gas abnormity cause and the occurrence probability of each type of the gas abnormity cause 540 may include the type of the gas abnormity cause and the occurrence probability of each type of the gas abnormity cause of a plurality of different nodes, for example, a type of the gas abnormity cause and an occurrence probability of each type of the gas abnormity cause 1, a type of the gas abnormity cause and an occurrence probability of each type of the gas abnormity cause 2, . . . a type of the gas abnormity cause and an occurrence probability of each type of the gas abnormity cause n. In some embodiments, the node attribute 510 may include updated abnormity scores of the nodes, and the edge attribute 520 may include updated weight values of the edges. For more contents of the updated abnormity score of the node and the updated weight value of the edge, please refer to FIG. 4 and related descriptions of the present disclosure.

In some embodiments, the prediction model 530 may be obtained through an individual training.

In some embodiments, the prediction model 530 may be obtained by training based on the plurality of training samples and their corresponding labels. The training samples may include a plurality of sample node attribute and a plurality of sample edge attribute, and the labels may include the type of the gas abnormity cause and the occurrence probability of each type of the gas abnormity cause corresponding to the above samples. In some embodiments, the training samples and the labels may be obtained based on historical data, for example, the samples and labels may be obtained based on historical node attribute, edge attribute and their corresponding abnormity causes.

The training sample may be input to an initial prediction model, and a loss function may be constructed based on an output of the initial prediction model and a label, a parameter of the initial prediction model may be updated through the loss function, until the trained initial prediction model satisfies a preset condition, and the trained prediction model 530 may be obtained. The preset condition may be that the loss function is smaller than a threshold, the loss function converges, or a training period reaches a threshold, etc.

In some embodiments of the present disclosure, through using the trained prediction model to analyze and process the node attribute and edge attribute of an updated image, the type of the abnormity cause and the occurrence probabilities of various abnormity causes may be determined more quickly and accurately, thereby satisfying the user's demands timely.

The basic concepts have been described above. Obviously, for those skilled in the art, the above detailed disclosure is merely for the purpose of illustration, and does not constitute a limitation of the present disclosure. Although not explicitly described herein, various modifications, improvements, and corrections to the present disclosure may be made by those skilled in the art. Such modifications, improvements, and corrections are suggested in the present disclosure, so such modifications, improvements, and corrections still belong to the spirit and scope of the embodiments of the present disclosure.

Meanwhile, the present disclosure uses specific words to describe the embodiments of the present disclosure, for example, "one embodiment," "an embodiment," and/or "some embodiments" mean a certain feature, structure, or characteristic associated with at least one embodiment of this disclosure. Therefore, it should be emphasized and noted that two or more references to "an embodiment" or "one embodiment" or "an alternative embodiment" in various places in the present disclosure are not necessarily referring to the same embodiment. Furthermore, certain features, structures, or characteristics of the one or more embodiments of the present disclosure may be combined as appropriate.

In addition, unless explicitly stated in the claims, the order of processing elements and sequences described in the present disclosure, the use of numbers, letters, or the use of other names is not intended to limit the order of the processes and methods of the present disclosure. While the above disclosure discusses by way of various examples some embodiments of the disclosure that are presently believed to be useful, it is to be understood that such details are only for illustration and that the appended claims are not limited to the disclosed embodiments. Rather, the claims aim to cover all corrections and equivalent combinations that are in line with the nature and scope of the embodiments of the present disclosure. For example, although the system components described above may be implemented by hardware devices, they may also be implemented by software-only solutions, such as installing the described systems on existing servers or mobile devices.

Similarly, it should be noted that, in order to simplify the expressions disclosed in the present disclosure and thus help the understanding of one or more embodiments of the present disclosure, in the foregoing description of the embodiments of the present disclosure, various features may sometimes be combined into one embodiment, one drawing or the descriptions thereof. However, this approach of disclosure does not imply that the features required by the present disclosure are more than the features recited in the claims. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." Unless stated otherwise, "about", "approximately" or "substantially" means that a variation of ±20% is allowed for the stated number. Accordingly, in some embodiments, the numerical parameters set forth in the written description and attached claims are approximations that may vary depending upon the desired properties sought to be obtained by a particular embodiment. In some embodiments, the numerical parameters should consider the reported significant digits and adopt the method of general digit reservation. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. Excepting any prosecution file history associated with same, any of same that is inconsistent with or in conflict with the present document, the documents that may have a limiting effect on the broadest scope of the claims (now or later attached to the present document) are also excluded. It should be noted that if there is any inconsistency or conflict between the description, definition, and/or the use of a term associated with any of the incorporated material and that associated with the present document, the description, definition, and/or the use of the term in the present document shall prevail.

Finally, it is to be understood that the embodiments of the disclosure disclosed herein are illustrative of the principles of the embodiments of the present disclosure. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for determining a gas abnormity for a safe gas use, wherein the method is implemented by a smart gas Internet of Things (IoT) system, the system comprises a smart gas user platform, a smart gas service platform, a smart gas safety management platform, a smart gas indoor device sensing network platform, and a smart gas indoor device object platform, wherein the smart gas user platform is configured as a terminal device, and is configured to interact with the smart gas service platform to send request information of a target user to the smart gas service platform, and receive analysis information of a gas abnormity cause uploaded by the smart gas service platform;

the smart gas service platform is configured to receive and transmit data and information, interact with the smart gas safety management platform to send the request information of the target user to the smart gas safety management platform, and receive the analysis information of the gas abnormity cause uploaded by the smart gas safety management platform;

the smart gas indoor device sensing network platform is configured as a plurality of groups of gateway servers or a plurality of groups of intelligent routers, and is configured to receive information related to the gas abnormity uploaded by the smart gas indoor device object platform and upload the information related to the gas abnormity to the smart gas safety management platform;

the smart gas indoor device object platform is configured as indoor gas devices and gas safety detection devices, and is configured to obtain the information related to the gas abnormity, upload the information to the smart gas indoor device sensing network platform, and receive an instruction for obtaining the information related to the gas abnormity issued by the smart gas indoor device sensing network platform;

the smart gas safety management platform includes a smart gas indoor safety management sub-platform and a smart gas data center, the smart gas indoor safety management sub-platform interacts with the smart gas data center in two directions; and the method is performed by the smart gas safety management platform, comprising:

receiving the request information of the target user, the request information including a request of the target user for analyzing the gas abnormity cause input by the target user via the smart gas user platform;

extracting user data based on the request information, and extracting gas data based on the user data, wherein the gas data includes a gas balance, gas pipeline data of all levels involved by the target user, gas usage data, and gas abnormity data of the target user; and determining, based on the user data and the gas data, analysis information of the gas abnormity cause; and generating a control signal when the analysis information of the gas abnormity cause contains an abnormity cause whose abnormity score exceeds the safety threshold, and sending the control signal to a safety valve control device object sub-platform so as to close gas valves, wherein the safety valve control device object sub-platform is a sub-platform of the smart gas indoor device object platform;

wherein the determining the analysis information of the gas abnormity cause comprises:

extracting a preset rule based on a rule base, and determining a candidate gas abnormity cause and a certainty level of the candidate gas abnormity cause through a rule determination engine; wherein the rule base refers to a knowledge base composed of various preset rules;

the preset rule refers to a rule that is artificially set in advance and is used to determine whether the user data and the gas data satisfy a condition, and the preset rule includes thresholds related to determining a type of the gas abnormity cause and a certainty level thereof;

the certainty level refers to a level of certainty of the gas abnormity cause, which is expressed as a percentage or a grade; the certainty level of 100% indicates that the gas abnormity cause is directly determined; the certainty level being less than 100% indicates that the gas abnormity cause is concluded through data analysis; and the preset rule or the rule determination engine is used to determine whether the user data and the gas data satisfy the preset rule;

determining whether the certainty level satisfies a first preset condition, wherein the first preset condition refers to a condition that is set in advance for determining whether to obtain additional data and continue analyzing the gas abnormity cause, and the first preset condition includes that the certainty level is greater than or equal to 90%; and in response to a determination that the certainty level does not satisfy the first preset condition, determining, based on pipeline information and user terminal information, the analysis information of the gas abnormity cause through a preset algorithm, wherein the pipeline information and the user terminal information are determined based on the user data and the gas data, the pipeline information includes pipeline gas information and pipeline terminal information, and the preset algorithm denotes an algorithm that is preset for analyzing and processing an image structure, wherein the preset algorithm comprises:

constructing, based on the pipeline information and the user terminal information, the image, a node of the image including a pipeline terminal node and a user terminal node, an edge of the image including a gas pipeline between nodes, and a direction of the edge is a gas delivery direction; attributes of the pipeline terminal node include an abnormity score, gas use data, and gas abnormity data of the pipeline terminal node; attributes of the user terminal node include an abnormity score, the gas usage data, user image data, and the gas abnormity data of the user terminal node; and attributes of the edge include a weight value and gas flow information; and analyzing, based on the preset algorithm, the image to determine the abnormity score of the node of the image; and updating, through a continuous iteration, the abnormity score of the node of the image until the abnormity score satisfies a second preset condition; and using a last updated abnormity score of the node of the image as a final score of the node.

2. The method of claim 1, wherein the preset algorithm further comprises:

when the attribute of a plurality of same-level nodes includes current abnormity data, increasing the abnormity score of a common parent node of the plurality of same-level nodes, wherein the same-level nodes refer to nodes that share a same common parent node, and the common parent node is a parent node with edges directly connected with the plurality of same-level nodes respectively.

3. The method of claim 1, further comprising:

predicting, based on attribute of a current node, attribute of an adjacent node, and attribute of an adjacent edge, a type of the gas abnormity cause and an occurrence probability of each type of the gas abnormity cause, wherein the attribute of the current node and the attribute of the adjacent node include an updated abnormity score of the current node and an updated abnormity score of the adjacent node, and the type of the gas abnormity cause includes insufficient balance of gas fee, gas pipeline blockage, terminal failure, or gas leakage.

4. The method of claim 3, wherein the predicting a type of the gas abnormity cause and an occurrence probability of each type of the gas abnormity comprises:

performing a prediction using a prediction model, wherein the prediction model includes a multi-type model.

5. A smart gas Internet of Things (IoT) system, wherein the system comprises: a smart gas user platform, a smart gas service platform, a smart gas safety management platform, a smart gas indoor device sensing network platform, and a smart gas indoor device object platform, the smart gas safety management platform includes a smart gas indoor safety management sub-platform and a smart gas data center, the smart gas indoor safety management sub-platform interacts with the smart gas data center in two directions, the smart gas user platform is configured as a terminal device, and is configured to interact with the smart gas service platform to send request information of a target user to the smart gas service platform, and receive analysis information of a gas abnormity cause uploaded by the smart gas service platform;

the smart gas service platform is configured to receive and transmit data and information, interact with the smart gas safety management platform to send the request information of the target user to the smart gas safety management platform, and receive the analysis information of the gas abnormity cause uploaded by the smart gas safety management platform;

the smart gas indoor device sensing network platform is configured as a plurality of groups of gateway servers or a plurality of groups of intelligent routers, and is configured to receive information related to the gas abnormity uploaded by the smart gas indoor device object platform and upload the information related to the gas abnormity to the smart gas safety management platform;

the smart gas indoor device object platform is configured as indoor gas devices and gas safety detection devices, and is configured to obtain the information related to the gas abnormity, upload the information to the smart gas indoor device sensing network platform, and receive an instruction for obtaining the information related to the gas abnormity issued by the smart gas indoor device sensing network platform;

the smart gas safety management platform includes a smart gas indoor safety management sub-platform and a smart gas data center, the smart gas indoor safety management sub-platform interacts with the smart gas data center in two directions; and the smart gas safety management platform is configured to:

receive the request information of the target user, wherein the request information includes a request of the target user for analyzing the gas abnormity cause input by the target user via the smart gas user platform;

extracting user data based on the request information, and extracting gas data based on the user data, wherein the gas data includes a gas balance, gas pipeline data of all levels involved by the target user, gas usage data and gas abnormity data of the target user; and determine, based on the user data and the gas data, analysis information of the gas abnormity cause, and generating a control signal when the analysis information of the gas abnormity cause contains an abnormity cause whose abnormity score exceeds the safety threshold, and sending the control signal to a safety valve control device object sub-platform so as to close gas valves, wherein the safety valve control device object sub-platform is a sub-platform of the smart gas indoor device object platform;

wherein the determining the analysis information of the gas abnormity cause comprise:

extracting a preset rule based on a rule base, and determining a candidate gas abnormity cause and a certainty level of the candidate gas abnormity cause through a rule determination engine;

wherein the rule base refers to a knowledge base composed of various preset rules;

the preset rule refers to a rule that is artificially set in advance and is used to determine whether the user data and the gas data satisfy a condition, and the preset rule includes thresholds related to determining a type of the gas abnormity cause and a certainty level thereof;

the certainty level refers to a level of certainty of the gas abnormity cause, which is expressed as a percentage or a grade; the certainty level of 100% indicates that the gas abnormity cause is directly determined; the certainty level being less than 100% indicates that the gas abnormity cause is concluded through data analysis; and the preset rule or the rule determination engine is used to determine whether the user data and the gas data satisfy the preset rule;

determining whether the certainty level satisfies a first preset condition, wherein the first preset condition refers to a condition that is set in advance for determining whether to obtain additional data and continue analyzing the gas abnormity cause, and the first preset condition includes that the certainty level is greater than or equal to 90%; and in response to a determination that the certainty level does not satisfy the first preset condition, determining, based on pipeline information and user terminal information, the analysis information of the gas abnormity cause through a preset algorithm, wherein the pipeline information and the user terminal information are determined based on the user data and the gas data, the pipeline information includes pipeline gas information and pipeline terminal information, and the preset algorithm denotes an algorithm that is preset for analyzing and processing an image structure, wherein the preset algorithm comprises:

constructing, based on the pipeline information and the user terminal information, the image, a node of the image including a pipeline terminal node and a user terminal node, an edge of the image including a gas pipeline between nodes, and a direction of the edge is a gas delivery direction; attributes of the pipeline terminal node include an abnormity score, gas use data, and gas abnormity data of the pipeline terminal node; attributes of the user terminal node include an abnormity score, the gas usage data, user image data, and the gas abnormity data of the user terminal node; and attributes of the edge include a weight value and gas flow information; and analyzing, based on the preset algorithm, the image to determine the abnormity score of the node of the image; and updating, through a continuous iteration, the abnormity score of the node of the image until the abnormity score satisfies a second preset condition; and using a last updated abnormity score of the node of the image as a final score of the node, send the analysis information of the gas abnormity cause to the smart gas data center; send the analysis information of the gas abnormity cause to the smart gas user platform by the smart gas data center through the smart gas service platform.

6. The system of claim 5, wherein the smart gas safety management platform is further configured to:

when the attribute of a plurality of same-level nodes includes current abnormity data, increase the abnormity score of a common parent node of the plurality of same-level nodes, wherein the same-level nodes are nodes with the same or similar features, and the common parent node is a parent node with edges directly connected with the plurality of same-level nodes respectively.

7. The system of claim 5, wherein the smart gas safety management platform is further configured to:

predict, based on attribute of a current node, attribute of an adjacent node and attribute of an adjacent edge, a type of the gas abnormity cause and an occurrence probability of each type of the gas abnormity cause, wherein the attribute of the current node and the attribute of the adjacent node include an updated abnormity score of the current node and an updated abnormity score of the adjacent node, and the type of the gas abnormity cause includes insufficient balance of gas fee, gas pipeline blockage, terminal failure, or gas leakage.

8. The system of claim 7, wherein the smart gas safety management platform is further configured to:

perform a prediction using a prediction model, wherein the prediction model includes a multi-type model.

9. A non-transitory computer-readable storage medium storing computer instructions, wherein when reading the computer instructions in the storage medium, a computer implements the method for determining a gas abnormity for a safe gas use according to claim 1.

10. The method of claim 1, wherein the updating the abnormity score of the node of the image through the continuous iteration comprises:

in each round of iteration, for each node, determining the updated abnormity score of the node of the image based on an abnormity score of a node of the image to be updated, abnormity scores of other nodes of the image directly connected to the node to be updated, and weight values of edges between the node and other connected nodes; and taking the updated abnormity score of the node of the image as the abnormity score of the node of the image to be updated in a next iteration, wherein in a first iteration round, the abnormity score to be updated for the node is an initial abnormity score of the node of the image, and the initial abnormity score of the node of the image is determined based on the gas usage data and the gas abnormity data of the node of the image.

11. The method of claim 10, wherein an algorithm for updating the abnormity score of a $i^{th}$ node in a $j^{th}$ round of iteration is:

$$V_i' = p*V_i + q*\Sigma_{k=1}^{K}(V_k*R_{ki}),$$

wherein $V_i'$ denotes the abnormity score to be updated in the next iteration; $V_i$ and $V_k$ denote the abnormity score of the ith node to be updated and the abnormity score of the kth node to be updated in this iteration; p and q are weight coefficients, which are determined by the smart gas safety management platform according to the attribute of the nodes and edges in the image; k denotes the node that has an edge connection with the ith node, and K denotes the number of nodes that have an edge connection with the ith node; $R_{ki}$ denotes the weight value of the edge between the ith node and the kth node.

* * * * *